Patented Nov. 24, 1936

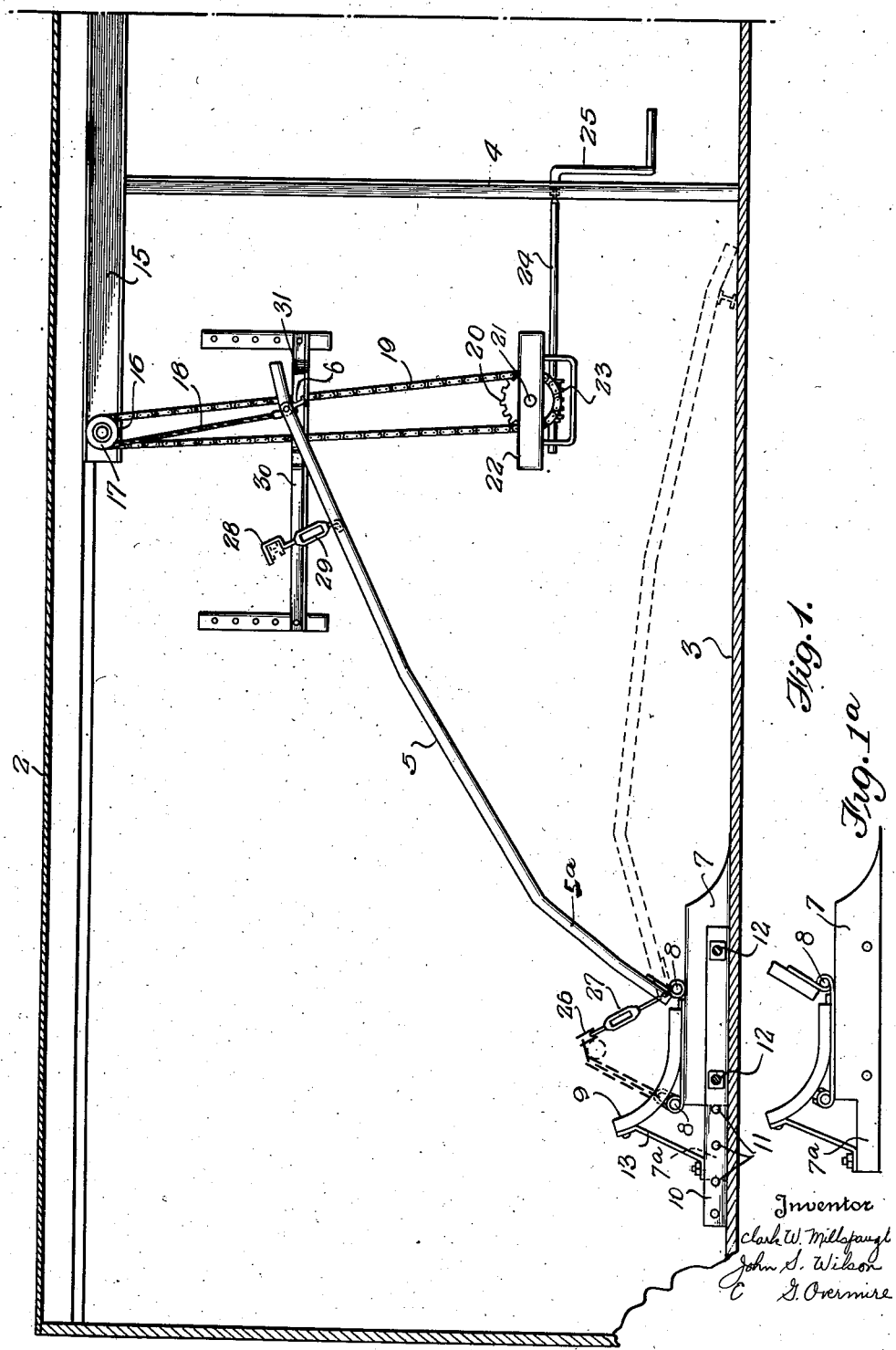

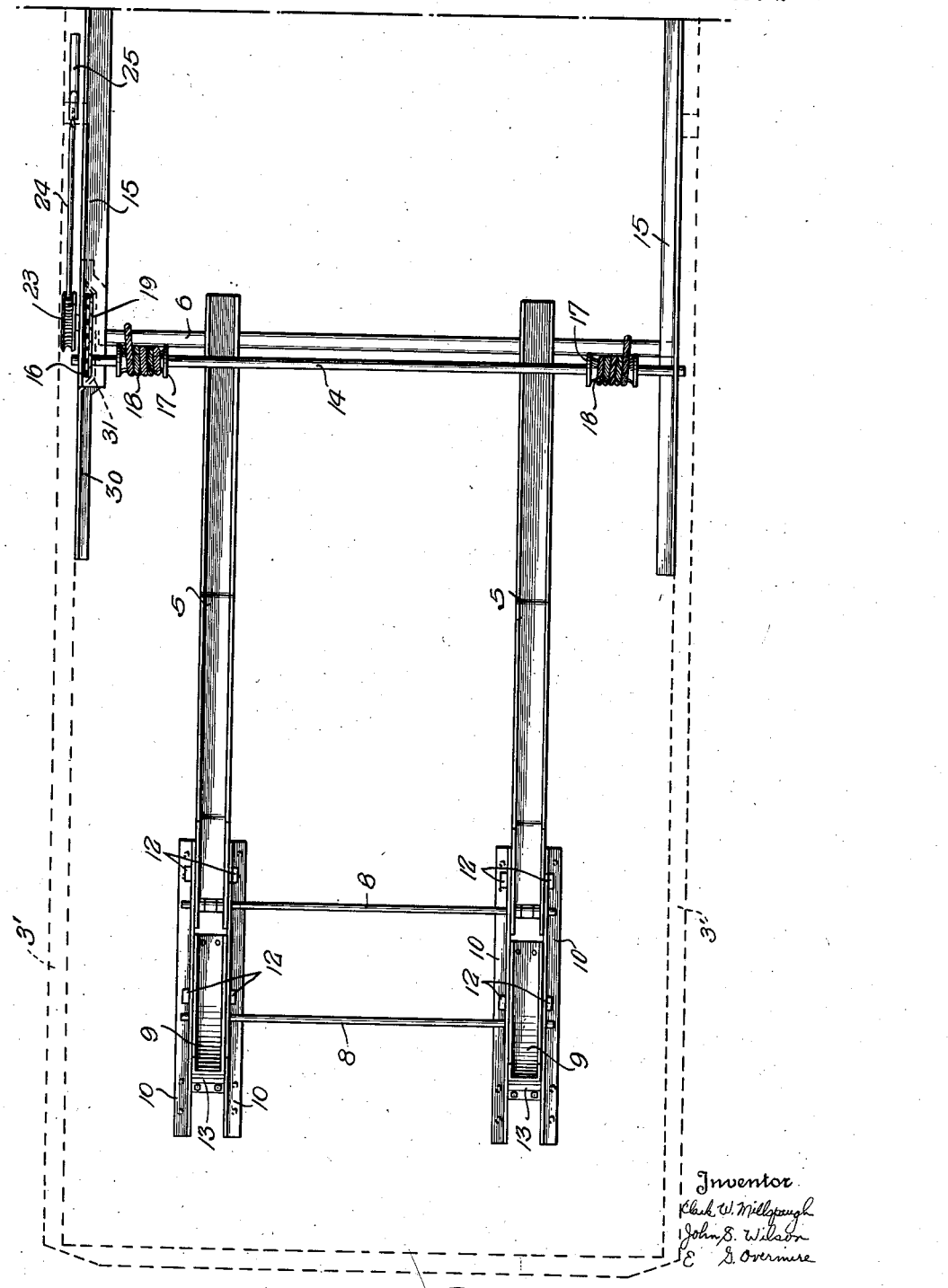

2,062,244

UNITED STATES PATENT OFFICE 2,062,244

VEHICLE LOADING RACK AND LIFTING DEVICE

John S. Wilson and Clark W. Millspaugh, Detroit, Mich., and Edwin G. Overmire, New York, N. Y., assignors to The New York Central Railroad Company, a corporation of New York Application March 10, 1932, Serial No. 598,054

12 Claims. (Cl. 105—368)

The object of our invention is to provide means for loading vehicles in box cars in such manner that a greater number of vehicles may be loaded in a car than was possible heretofore.

By our invention we provide a loading frame, rack or deck at each end of the car adapted to receive a vehicle, which frame or rack, by suitable means, may be moved upwardly to an inclined position relative to the car floor to support a vehicle in such inclined position, whereby another vehicle may be nested on the floor under the inclined rack.

In the drawings:—

Fig. 1 is a vertical sectional view through a part of a car, showing the application of the invention thereto, the frame or rack appearing in full and dotted lines in shipping and loading positions, respectively.

Fig. 1a is a side elevation of one of the wheel chocks removed from its guides.

Fig. 2 is a top plan view of Fig. 1, the car being indicated by dotted lines.

While we have shown but one end of a box car, it will be understood that the other end is likewise equipped.

The reference numeral 1 designates a box car of approved construction, having a roof 2, floor 3, side walls 3', and door opening 4.

The loading and lifting frame, rack or deck is composed of two channeled members, runways or tracks 5, which are connected at their forward ends by means of a bar or rod 6, the ends of which project beyond the runways as clearly shown in Fig. 2.

The rear ends of the runways are connected and pivotally mounted on anchor blocks 7 by means of a pivotal bar 8 extending across the frame or rack, as shown in Fig. 2, each block having a reduced rear or tail portion 7a of less height than its main or body portion.

The main or body portion of each block 7 has fixed thereto a chock 9 of arcuate shape, which projects at its rear end beyond said main or body portion and is connected at such end to the tail portion 7a by a supporting and bracing member 13. Each block is slidably mounted between a pair of guides 10 fastened to the car floor so that the pivoted end of the frame and the chock may be adjusted longitudinally of the car to properly position the frame in the car to suit the length of an automobile which is to be supported on the floor beneath the automobile supported on the elevated runway 5 and to allow the underlying automobile to be accommodated in the available space. Each anchor block bar and its guides 10 are provided with openings 11 adapted to register in adjusted positions of the bar for the passage of bolts 12 whereby the bar may be fastened in adjusted position.

A shaft 14 is journaled in side reinforcing channels 15 over the doorways 4, and said shaft extends from side to side of the car, as best seen in Fig. 2. A sprocket wheel 16, keyed to said shaft, is positioned on an end of the shaft adjacent to one of the side walls. The shaft 14 carries cable winding drums 17, to each of which one end of a cable 18 is secured, the other ends of the cables being secured to the connecting bar 6 of the runways on the outer sides of the runways. A chain 19 travels over the sprocket 16 on the shaft 14 and over a sprocket 20 carried by a shaft 21 mounted in a suitable bracket 22, secured to the car side wall therebelow. This chain is driven by suitable worm gearing 23, operated by the shaft 24 actuated by means of a detachable crank 25. The worm gearing renders the hoisting means above described self-locking to hold the rack in raised position.

The rack is shown in lowered or loading position in dotted lines in Fig. 1, in which position the wheels of the vehicle may be run on the runways until the wheels of the vehicle nearest the end of the car are seated in the chock 9. A chain lock 26, carried by each block 7 and having a turn buckle 27 is now passed over the axle at that end of the vehicle and the free end of the chain securely anchored to the block.

The chain 19 is now operated to drive the drums 17 and elevate the forward end of the rack to the shipping position shown in full lines in Fig. 1, but before this is done clamps 28, secured to the rack, are secured to the other axle of the vehicle. When the rack with its load is in proper or desired elevated position, the turn buckles 27 of the chains 26 and turn buckles 29 of the clamps 28 are manipulated to firmly secure the chains and clamps to hold the vehicle on the rack against all service movements of the car.

It will be noted that the chain operates back of the guard 30 secured to the adjacent side wall of the car, i. e., between said guard and wall, said guard having an offset portion 31 through which the chain moves to prevent interference with the rack as the rack is being operated.

It will also be noted that the pivoted ends of the rack bars or rails are bent downwardly, as at 5a, at an angle to the remaining portions of the rails, so that when the rack is in its lowered position, shown in dotted lines in Fig. 1, the portions 5a form inclined planes extending upwardly and forwardly at the front of the chocks 9, and so that when the rack is in the raised position shown in full lines in Fig. 1 the chocks and rack portions 5a will form opposed abutments at the rear and front of the rear wheels of the vehicle resting in the chocks. Thus when a vehicle is run upon the lowered rack in readiness to be elevated the chocks and rail portions 5a will serve to hold the vehicle steady and from running forward on the rack while the anchors 26, 27 are being applied even in the event that the car is standing on an inclined track or is being shifted during the operation of raising the vehicle. Also after the vehicle has been raised and anchored in place the opposed abutments formed by the chocks and rack portions 5a will prevent the vehicle from shifting forwardly or rearwardly and straining or breaking the anchors 26, 27, 28, 29 even when the car is subjected to sudden or violent shocks or jars incident to quick train starting or stopping operations which might otherwise, particularly in the case of severe shocks, tend to break the anchors and cause injury to the vehicle or its displacement from the rack.

What we claim is:

1. In a device for loading vehicles on a box car, supporting means attached to the car floor, vehicle anchoring means carried by said supporting means, a vehicle rack having vehicle supporting tracks and pivoted at one end thereof to the supporting means for movement in a vertical plane, means connected to the free end of the rack for raising and lowering the rack and holding it in adjusted position, and vehicle anchoring means carried by the rack.

2. In a device for loading vehicles on a box car, a sliding support attached to the car floor for adjustment longitudinally of the car, vehicle anchoring means directly mounted on said support, a vehicle rack having vehicle supporting tracks and pivoted at one end thereof to the support for movement in a vertical plane, means connected to the free end of the rack for raising and lowering the rack and holding it in adjusted position, and vehicle anchoring means carried by the rack.

3. In a device for loading vehicles on a box car, an anchoring device secured to the car floor, car holding means carried by said device, a vehicle supporting rack having vehicle supporting tracks and pivotally connected at one end thereof to said anchoring device for swinging movement in a vertical plane, means for raising and lowering the rack, and vehicle holding means on the rack.

4. In a device for loading vehicles on a box car, longitudinally adjustable wheel chocks mounted on the floor of the car for supporting one end of a vehicle, a vehicle supporting frame including longitudinally extending track rails forming wheel runways, said frame being pivotally mounted at one end on the car floor adjacent to and with said rails in alinement with the wheel chocks so as to be bodily movable in a vertical plane on a horizontal transverse axis to support a vehicle in differently inclined positions, means associated with said chocks for engaging one of the axles of the vehicle and holding the wheels carried thereby seated in the chocks, means on the frame for engaging the other axle of the vehicle and holding the wheels carried thereby seated in the track rails, and operating means connected with the free end of the frame whereby said frame may be swung upwardly and downwardly and supported in a desired inclined position.

5. In a device for loading vehicles on a box car, guides on the floor of the car, longitudinally adjustable supports connected with the guides, wheel chocks mounted on the longitudinally adjustable supports, a vehicle supporting frame including longitudinally extending wheel runways pivotally mounted at one end upon the adjustable supports so as to swing vertically to different inclined positions on a horizontal transverse axis, means associated with the chocks for engaging and holding down a vehicle at one end, means on the frame adjacent its free end for engaging and holding down the vehicle at its opposite end, and raising and lowering gear connected with the free end of the frame whereby said frame may be raised and lowered and held supported in an inclined position.

6. In a device for loading vehicles on a box car, anchoring members adjustably mounted on the floor of the car, wheel engaging means carried by said anchoring members, a vehicle supporting frame pivotally connected at one end to the anchoring members for swinging movement to differently inclined positions on a horizontal transverse axis, hold down means mounted on the anchoring members in the rear of the pivoted end of the frame for connecting one end of a vehicle therewith, means on the frame for connecting the other end of the vehicle thereto, and hoisting and supporting gear including a cable operatively connected with the free end of the frame whereby the frame may be raised and lowered and held in adjusted position.

7. In a device for loading vehicles on a car, anchoring members adjustably mounted on the floor of the car, wheel engaging means for engagement with the rear wheels of a vehicle carried by said anchoring members, a vehicle supporting frame including wheel runways pivotally mounted upon one end of the anchoring members in advance of said wheel engaging means for swinging movement to differently inclined positions on a horizontal transverse axis, hold down devices respectively disposed on the said wheel engaging means and frame for connecting opposite ends of a vehicle therewith, and hoisting and supporting means connected with the free end of the frame whereby the frame may be raised and lowered and held in adjusted position.

8. In a device for loading vehicles in a freight car, a vehicle supporting rack pivotally mounted at one end within the car for tilting the vehicle from a horizontal to an inclined position and vice versa, means for raising and lowering the rack and holding it in its inclined position, and means mounted on the car floor beyond the pivoted end of the rack and upon the rack respectively for engaging parts of the running gear of the vehicle to brace and hold the supported vehicle from shifting.

9. In a device for loading a vehicle in a freight car, a support upon the floor of the car comprising adjustably connected members, a wheel chock carried by one of said members, a vehicle lifting and supporting rack pivotally connected with the said one member for tilting movement to raise and lower a vehicle resting therein and with the wheels at one end thereof engaging said chock from a horizontal position to an inclined position or vice versa, means for raising and lowering the rack and holding the same in its inclined position, bracing means associated with the chock for engagement with the vehicle at the chocked end, and bracing means for securing the vehicle at its other end to the rack.

10. In a device for loading vehicles on a freight car, a wheel chock mounted on the floor of the car for supporting one end of a vehicle in fixed relation to the floor, a vehicle supporting rack for raising the other end of the vehicle above the floor pivotally mounted at one end on the floor of the car adjacent to and in advance of said chock for tilting movements in a vertical plane, means connected with the free end of the rack for raising and lowering the same, vehicle holding means associated with the chock, and vehicle holding means on the rack adjacent the free end thereof.

11. In a device for loading vehicles in a freight car, guides on the car floor, a supporting member adjustable longitudinally of the car and guided by and adapted to be adjustably secured to the guides, a wheel chock mounted on said supporting member for supporting one end of a vehicle in fixed relation to the floor, a vehicle supporting rack pivotally mounted at one end on the supporting member in advance of the chock, means connected with the free end of the rack for raising and lowering the same, vehicle hold-down means associated with the chock, and vehicle holding means on the rack adjacent the free end thereof.

12. In a vehicle holding device for freight cars, wheel chocks mounted on the floor of the car to support one end of the vehicle in fixed relation to the car floor, a wheel receiving rack for supporting the other end of the vehicle, said rack being pivotally mounted at one end on the car adjacent to said chock for vertical movement to dispose the vehicle in an inclined position in the car, the pivoted end portion of the rack being arranged at an angle with relation to the remainder of the rack so as to form with the chocks opposed wheel engaging abutments to prevent either forward or backward movement of the supported vehicle on its said supports, and means for fastening the car at its ends to the chocks and to the rack respectively.

JOHN S. WILSON.
CLARK W. MILLSPAUGH.
EDWIN G. OVERMIRE.